US012592212B1

(12) United States Patent
Thoresen

(10) Patent No.: US 12,592,212 B1
(45) Date of Patent: Mar. 31, 2026

(54) INVERTED STRING NUT FOR ZERO-FRET GUITAR SYSTEMS

(71) Applicant: Tore Geir Thoresen, Roeyken (NO)

(72) Inventor: Tore Geir Thoresen, Roeyken (NO)

( * ) Notice: Subject to any disclaimer, the term of this patent is extended or adjusted under 35 U.S.C. 154(b) by 0 days.

(21) Appl. No.: 19/364,315

(22) Filed: Oct. 21, 2025

Related U.S. Application Data

(60) Provisional application No. 63/854,680, filed on Jul. 31, 2025.

(51) Int. Cl.
*G10D 3/12* (2020.01)

(52) U.S. Cl.
CPC .................................... *G10D 3/12* (2013.01)

(58) Field of Classification Search
CPC ........................................................ G10D 3/12
USPC ........................................................ 84/297 R
See application file for complete search history.

(56) References Cited

U.S. PATENT DOCUMENTS 536,563 A * 3/1895 Converse ................ G10G 7/02 84/454
1,223,744 A * 4/1917 Smith ...................... G10D 3/14 84/314 N
2,214,957 A * 9/1940 Furgiuele ................ G10D 1/08 84/314 N
2,604,805 A * 7/1952 Haffner .................. G10D 3/053 84/318
2,959,085 A * 11/1960 Porter ...................... G10D 3/04 84/297 R
3,011,380 A * 12/1961 Brimhall .................. G10D 3/08 984/116
4,171,661 A * 10/1979 Rose ...................... G10D 3/153 84/307
4,206,679 A * 6/1980 Wilson ..................... G10D 3/06 984/118
4,248,127 A * 2/1981 Lieber ...................... G10D 1/08 984/118
D263,149 S * 2/1982 Wilson ........................ 84/314 N
4,517,874 A * 5/1985 Fender ..................... G10D 3/12 84/214
4,535,670 A * 8/1985 Borisoff ................. G10D 3/147 984/120

(Continued)

FOREIGN PATENT DOCUMENTS

DE 102018107366 A1 * 10/2019 ............ G10D 3/053
GB 2349010 A * 10/2000 ............ G10D 3/053

(Continued)

*Primary Examiner* — Christina M Schreiber

(57) ABSTRACT

An inverted string nut assembly for zero-fret guitar systems is disclosed. The assembly includes downward-facing tunneled slots that guide each string through a dual-bend configuration, maintaining consistent pressure and precise lateral spacing across the zero fret. Each tunnel features a solid, curved roof to minimize friction and facilitate smooth string movement during tuning. The nut is mounted on a flat surface adjacent to the zero fret and is removably secured, allowing for adjustment without detaching the strings. The headstock is configured as a linear extension of the neck, with tuning machine posts positioned to align the string axis substantially parallel to the headstock surface. This configuration enhances structural integrity, sustain, and tonal performance across a range of guitar designs.

7 Claims, 4 Drawing Sheets

(56) References Cited

U.S. PATENT DOCUMENTS

| | | | | | |
|---|---|---|---|---|---|
| 4,696,219 | A * | 9/1987 | Plescia | G10D 3/12 | 984/118 |
| 4,709,612 | A * | 12/1987 | Wilkinson | G10D 3/12 | 84/314 N |
| 5,394,783 | A * | 3/1995 | Sperzel | G10D 3/04 | 84/307 |
| 5,481,956 | A * | 1/1996 | LoJacono | G10D 3/04 | 84/314 N |
| 5,696,336 | A * | 12/1997 | Sperzel | G10D 3/04 | 84/297 R |
| 5,750,910 | A * | 5/1998 | LoJacono | G10D 3/04 | 84/314 N |
| 5,932,822 | A * | 8/1999 | Bernstein | G10D 3/12 | 84/314 N |
| 6,252,149 | B1 * | 6/2001 | Matsushita | G10D 3/06 | 84/314 N |
| 6,433,264 | B1 * | 8/2002 | Gimpel | G10D 1/04 | 84/314 N |
| 6,706,957 | B1 * | 3/2004 | Merkel | G10D 1/05 | 84/314 N |
| 6,723,905 | B2 * | 4/2004 | Gillis | G10D 3/053 | 84/317 |
| 7,692,080 | B1 * | 4/2010 | Rushing | G10D 1/00 | 84/314 R |
| 8,294,012 | B1 * | 10/2012 | Garrick | G10D 3/12 | 84/314 N |
| 8,653,345 | B1 * | 2/2014 | Rogers | G10D 1/10 | 84/314 N |
| 9,361,863 | B1 * | 6/2016 | McClary | G10D 3/053 | |
| 9,837,054 | B1 * | 12/2017 | McCabe | G10D 1/085 | |
| 10,255,893 | B1 * | 4/2019 | Clark | G10D 1/08 | |
| 10,586,517 | B2 * | 3/2020 | Dickinson | G10D 3/04 | |
| 11,164,549 | B1 * | 11/2021 | Baird | G10D 3/12 | |
| 2002/0078815 | A1 * | 6/2002 | Lojacono | G10D 1/08 | 84/314 N |
| 2003/0164081 | A1 * | 9/2003 | Booker | G10D 3/06 | 84/314 R |
| 2004/0159204 | A1 * | 8/2004 | Rose | G10D 3/14 | 84/298 |
| 2004/0173080 | A1 * | 9/2004 | Pye | G10D 1/08 | 84/314 R |
| 2005/0087056 | A1 * | 4/2005 | Zager, Jr. | G10D 3/053 | 84/318 |
| 2006/0156893 | A1 * | 7/2006 | Kinoshita | G10D 3/153 | 84/314 N |
| 2011/0036228 | A1 * | 2/2011 | Deck | G10D 3/153 | 84/313 |
| 2012/0255419 | A1 * | 10/2012 | Lucas | G10D 3/053 | 84/318 |
| 2015/0248875 | A1 * | 9/2015 | Johns | G10D 3/22 | 84/314 R |
| 2015/0348519 | A1 * | 12/2015 | Bishop | G10D 3/14 | 84/304 |
| 2018/0061378 | A1 * | 3/2018 | Berg | G10D 1/08 | |
| 2019/0348017 | A1 * | 11/2019 | Clark | G10D 1/085 | |
| 2021/0272538 | A1 * | 9/2021 | Kebrle | G10D 1/08 | |
| 2022/0084485 | A1 * | 3/2022 | Colon | G10D 3/14 | |
| 2022/0246116 | A1 * | 8/2022 | Paige | G10D 3/053 | |
| 2022/0319473 | A1 * | 10/2022 | Poschelk | G10D 3/14 | |
| 2023/0222996 | A1 * | 7/2023 | Singh | G10D 3/12 | 84/297 R |
| 2024/0233688 | A9 * | 7/2024 | Perry | G10D 3/14 | |

FOREIGN PATENT DOCUMENTS

| | | | | | |
|---|---|---|---|---|---|
| JP | S6161589 | U | * | 4/1986 | |
| JP | H0371391 | U | * | 7/1991 | |
| RU | 2602959 | C2 | * | 11/2016 | |
| WO | WO-2024264036 | A1 | * | 12/2024 | G10D 1/08 |

* cited by examiner

INVERTED STRING NUT FOR ZERO-FRET GUITAR SYSTEMS

CROSS-REFERENCE TO RELATED APPLICATIONS

This application claims the benefit of U.S. Provisional Patent Application No. 63/854,680, filed Jul. 31, 2025, entitled "INVERTED GUITAR STRING NUT FOR ZERO FRET APPLICATION", the entire contents of which are incorporated herein by reference.

PRIOR ART

This application references U.S. Pat. No. 4,206,679, titled "Electric Spanish guitar, and nut incorporated therein," filed on Apr. 11, 1978, by Gregg Wilson. The referenced patent discloses a guitar nut designed to increase sustain by guiding strings through hole passages with two sharp bends at each end.

The present invention differs significantly from Wilson's design by introducing a nut with a single bend and bottom-open slots, allowing for easy removal and adjustment without detaching the strings. It is specifically designed for use with a zero fret, which defines string height, rather than relying on the nut alone. The curved slots reduce friction and improve tuning stability, eliminating the need for precise slot height calibration.

TECHNICAL FIELD

The present invention pertains to stringed musical instruments, and more specifically to guitars. It relates to an improved nut assembly designed for use in conjunction with a zero fret, configured to enhance tuning stability, facilitate string adjustment, and improve overall tonal performance.

BACKGROUND OF THE INVENTION

Conventional guitars typically feature a neck with tuning machines mounted on the rear side of the headstock, with tuning posts protruding through the front surface. Strings are anchored to these posts and routed through a slotted nut, where they bend and continue along the neck toward the bridge.

In some guitar designs, a zero fret is positioned adjacent to the nut. In such configurations, the strings bend over the zero fret, which serves as the initial vibrating point, while the nut primarily functions to position and space the strings laterally.

A common neck design includes a headstock angled relative to the neck when viewed from the side, creating a break angle that maintains string pressure on the nut or zero fret.

Another prevalent design maintains the headstock surface parallel to the fretboard plane, often relying on string retainers to achieve sufficient downward pressure on the strings.

While both configurations are widely used, they present limitations in terms of structural integrity, tuning stability, and energy retention in the vibrating strings. These shortcomings highlight the need for an improved nut and headstock configuration that enhances tonal performance, simplifies adjustment, and maintains consistent string pressure across the zero fret.

SUMMARY OF THE INVENTION

The present invention provides an inverted guitar string nut assembly configured for use with a zero fret. The nut includes downward-facing tunneled slots that guide each string through a dual-bend configuration, maintaining consistent pressure and precise lateral spacing across the zero fret. Each tunnel features a solid, curved roof designed to minimize friction and enable smooth string movement during tuning. The nut is mounted on a flat surface adjacent to the zero fret and is removably secured to allow adjustment without detaching the strings. The headstock is configured as a linear extension of the neck, with tuning machine posts positioned to align the string axis substantially parallel to the headstock surface. This geometry enhances structural integrity, sustain, and tonal performance. The design simplifies installation and adjustment while improving tuning stability, tonal consistency, and mechanical reliability in zero-fret guitar systems.

BRIEF DESCRIPTION OF DRAWINGS

The accompanying drawings illustrate various views of the inventive inverted string nut and its integration with the guitar neck and headstock. Dashed lines indicate environmental structure and are not part of the claimed invention, but are included to illustrate the mounting context and functional integration:

DETAILED DESCRIPTION OF INVENTION

Description of Components

1. String Nut

Figure 1:
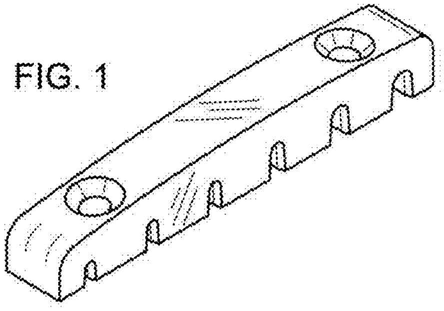
FIG. 1 is a perspective top view of the inverted string nut.
Figure 2:
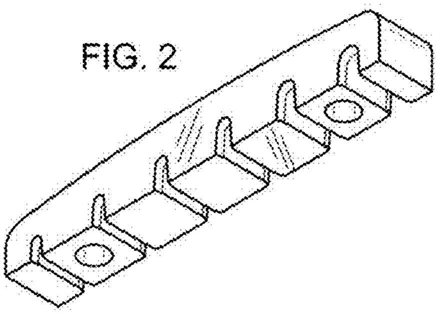
FIG. 2 is a perspective bottom view of the inverted string nut.
Figure 3:
FIG. 3 is a bottom view of the inverted string nut.
Figure 4:
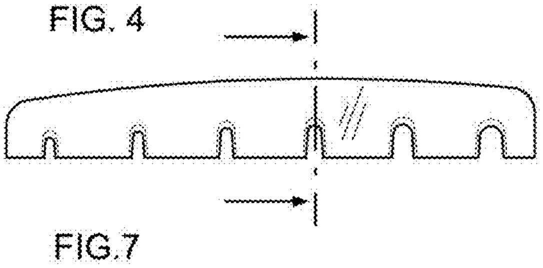
FIG. 4 is a front view of the inverted string nut.
Figure 5:
FIG. 5 is a side view of the inverted string nut.

The inverted string nut [1], shown in FIG. 1 and FIG. 2, is a structural component mounted at the end of the fretboard. It serves both to retain and position the strings. It features downward-facing slots or tunnels that guide the strings over the zero fret and toward the tuning machine posts.

2. Zero Fret

Figure 10:
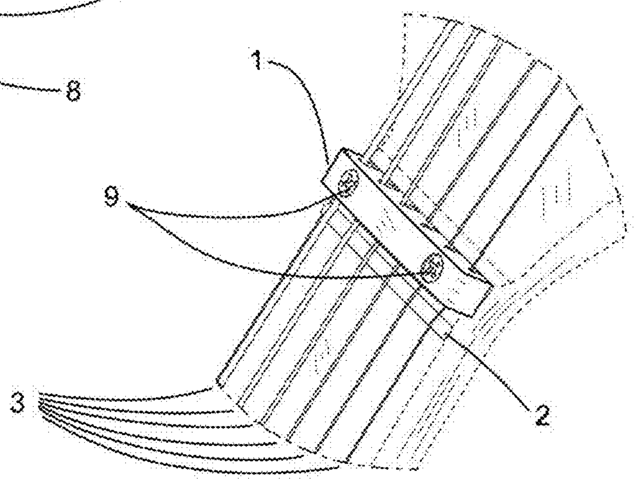
FIG. 10 is an enlarged detail view showing the inverted string nut and the zero fret.
Figure 12:
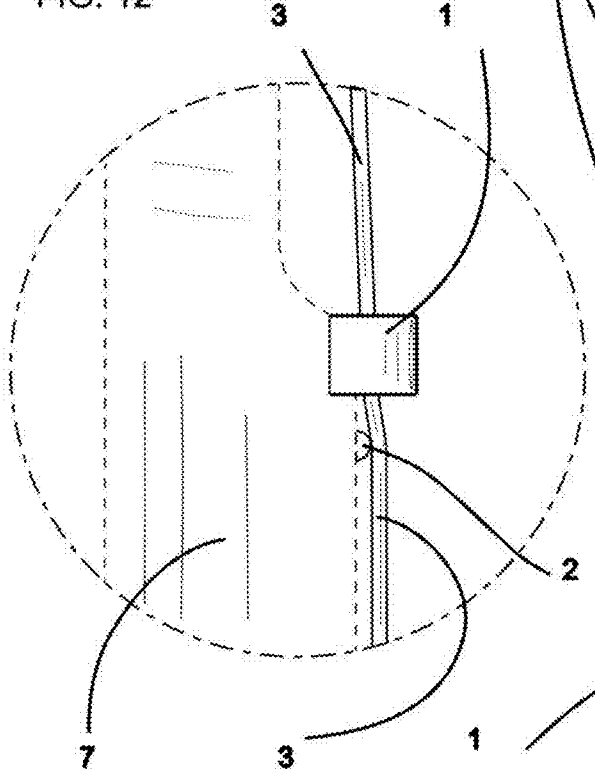
FIG. 12 is an enlarged left side detail view showing the inverted string nut and the zero fret.

As illustrated in FIG. 10 and FIG. 12, the zero fret [2] is positioned immediately adjacent to the string nut and serves as the upper vibrating endpoint of the strings. The strings rest directly on this fret, which defines the open string length and contributes to consistent tonal characteristics.

3. Strings

Figure 9:
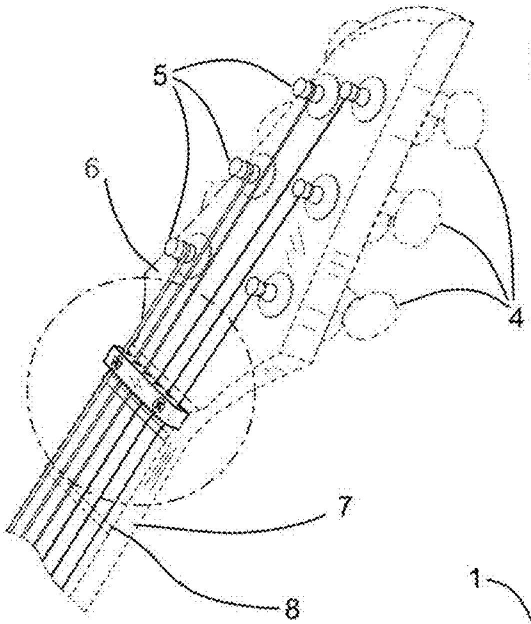
FIG. 9 is a perspective view of the headstock portion of the guitar neck.
Figures 13, 14:
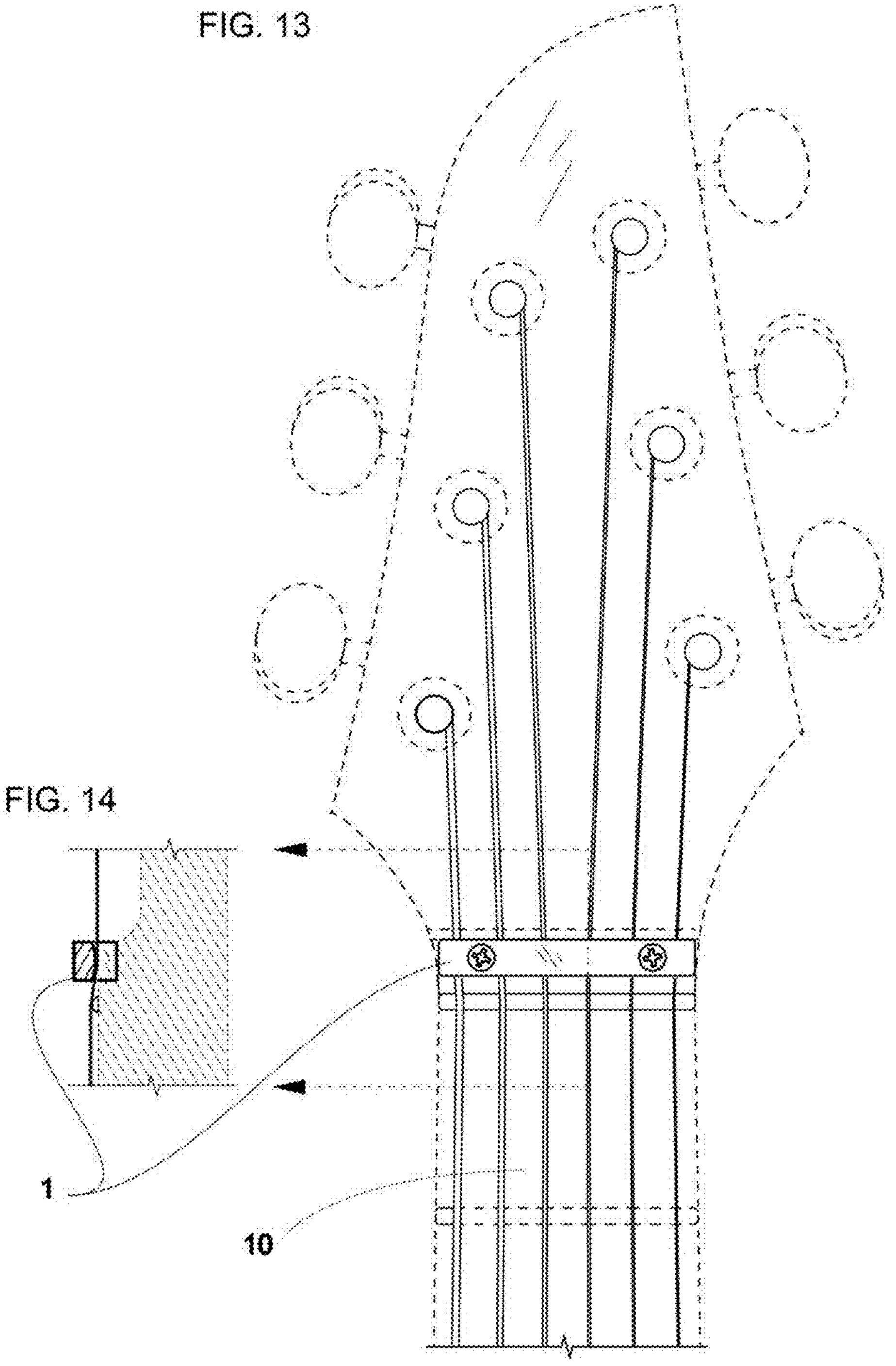
FIG. 13 is a front view of the headstock and guitar neck.
FIG. 14 is a sectional view showing the inverted string nut in relation to the guitar neck.

Strings [3], visible in FIG. 9 and FIG. 13, are tensioned wires that extend from the bridge to the tuning machine posts, passing over the zero fret and through the inverted nut slots. They produce sound when plucked.

4. Tuning Machines

Figure 11:
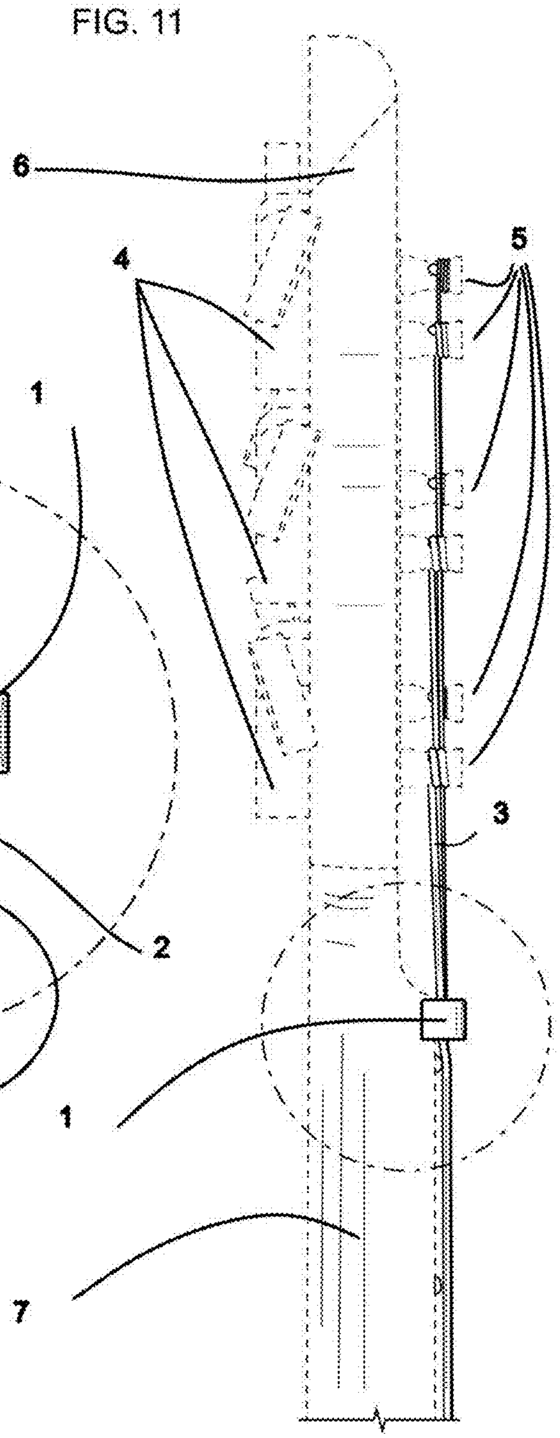
FIG. 11 is a left side view of the headstock.

Tuning machines [4], shown in FIG. 9, FIG. 11 and FIG. 13, are mechanical devices mounted on the rear side of the headstock, used to adjust string tension and pitch. Each tuning machine includes a rotatable mechanism connected to a tuning post.

5. Tuning Machine Posts

Tuning machine posts [5], visible in FIG. 9, FIG. 11 and FIG. 13, protrude through the front surface of the headstock and serve as the termination point for each string.

6. Headstock

The headstock [6], shown in FIG. 9, FIG. 11 and FIG. 13, is the forward extension of the guitar neck, housing the tuning machines and posts. In this invention, the headstock is aligned linearly with the neck to enhance structural integrity.

7. Neck

The neck [7], visible in FIG. 9 and FIG. 11, is the elongated portion of the guitar extending from the body to the headstock, supporting the fretboard and facilitating string tension and playability.

8. Fret Number 1

Fret number one [8], shown in FIG. 9 and FIG. 13, is located immediately after the zero fret. When a string is pressed against this fret, it defines a new vibrating length between fret one and the bridge.

9. Mounting Screws

Mounting screws [9], visible in FIG. 10, and FIG. 13, are fasteners used to secure the inverted string nut to the flat surface of the neck. These screws ensure stable positioning and alignment of the nut relative to the zero fret and fretboard.

10. Fretboard Surface

The fretboard surface [10], shown in FIG. 13, is the playing surface of the neck where frets are mounted. It may be an integral part of the neck or a separate wooden layer affixed to the neck. The fretboard defines the scale length and facilitates accurate finger placement.

Overview

The present invention relates to an innovative guitar string nut design, referred to herein as an inverted string nut [1]. This component may be fabricated from durable materials such as metal or carbon fiber-reinforced PEEK (polyether ether ketone) plastic. The latter material is preferred for its tonal properties, high mechanical strength, low friction, and wear resistance.

The invention is specifically designed to allow for a flat, straight headstock without the need for a retainer bar or string trees, and to function in conjunction with a zero fret [2], which serves as the initial contact point for the strings. A typical guitar neck [7] includes a series of frets—commonly 22—numbered sequentially from the headstock [6] toward the guitar body. The zero fret [2] is positioned before fret number one [8] and defines the vibrating length of open strings [3], contributing to tonal consistency and accurate intonation.

Structure of the Inverted String Nut

As shown in FIG. 1 and FIG. 2, the inverted string nut [1] features downward-facing slots, distinguishing it from conventional nut designs. These slots are oriented toward a flat cut plane on the fretboard surface adjacent to the zero fret [2]. The nut includes two drilled holes that accommodate screws [9] for secure attachment to the neck [7]. When mounted, each slot forms a tunnel with two openings—one facing the zero fret [2] and one facing the tuning machine posts [5]—through which the strings [3] are threaded. The string nut [1] can be removed for adjustment without removing the strings.

String Retention and Positioning

The tunneled slots serve a dual function:

They retain the strings [3] in a downward position against the zero fret [2].

They maintain lateral spacing of the strings [3] across the zero fret [2], ensuring consistent alignment and playability.

String Bending Mechanics

FIG. 10 illustrates the inverted string nut [1] mounted adjacent to the zero fret [2], with strings [3] threaded through the tunneled slots. This view highlights the dual-bend geometry and the interaction between the nut and the zero fret, which is essential to maintaining consistent string pressure.

The design induces a dual bend in each string:

The first bend occurs as the string [3] passes over the zero fret [2].

The second bend is created as the string is forced downward through the tunneled slot of the inverted nut [1].

Figure 6:
FIG. 6 is a sectional view of the inverted string nut.
Figure 7:
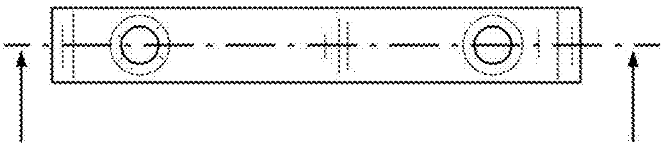
FIG. 7 is a top view of the inverted string nut.
Figure 8:
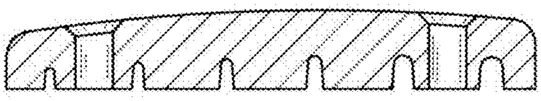
FIG. 8 is an additional sectional view of the inverted string nut.

As illustrated in the sectional view of FIG. 6, each tunnel has a solid, slightly curved roof that allows the string to slide smoothly without sticking, facilitating tuning and minimizing friction. This second bend is oriented opposite to the first, enhancing string stability and tonal consistency.

Headstock Geometry and String Axis

Each string [3] is anchored to a tuning machine post [5] at a height that aligns the string's axis parallel to the headstock [6] surface when viewed from the side. To achieve this geometry, the headstock front surface is positioned approximately 7 mm below the fretboard surface [10].

This configuration, shown in FIG. 11 and FIG. 14, allows the headstock to form a linear extension of the neck [7], optimizing structural integrity and enhancing sustain by preserving the energy of vibrating strings [3].

The invention claimed is:

1. A string nut body configured for mounting on a guitar neck adjacent to a zero fret, the guitar neck terminating in a headstock carrying a plurality of tuning machine posts, the string nut body comprising:

a plurality of downward-facing tunnels, each tunnel having a first opening facing the zero fret and a second opening facing a corresponding tuning machine post on the headstock, each tunnel configured to receive a guitar string extending from the corresponding tuning machine post, through the tunnel, across the zero fret, and along the length of the guitar neck, each tunnel configured such that the string forms a first bend over the zero fret and a second bend within the tunnel, the second bend being oriented opposite to the first to reinforce string stability and downward pressure on the zero fret, each tunnel further configured to maintain lateral spacing of the strings across the zero fret and to guide the string along a controlled path, a solid, curved roof over each tunnel configured to guide the string and facilitate sliding without frictional sticking, and a mounting structure configured to secure the string nut body to the guitar neck adjacent to the zero fret.

2. The string nut body of claim 1, wherein each tunnel has a curved internal profile configured to guide the string smoothly through the tunnel without binding.

3. The string nut body of claim 1, wherein the mounting structure comprises mounting holes configured to receive screws for securing the nut body to the guitar neck.

4. The string nut body of claim 1, wherein the tunnels are spaced to maintain predetermined lateral spacing of the strings across the zero fret.

5. The string nut body of claim 1, wherein the nut body is removably mounted to the neck to allow adjustment without detaching the strings.

6. The string nut body of claim 1, wherein each tunnel is downward-facing such that the strings are maintained within the tunnel during installation and tuning.

7. The string nut body of claim 1, wherein the solid, curved roof is shaped to prevent upward displacement of the string during bending, tuning, or vibration.

* * * * *